United States Patent [19]
Hannan et al.

[11] Patent Number: 6,125,696
[45] Date of Patent: *Oct. 3, 2000

[54] DIGITAL LIQUID LEVEL SENSING APPARATUS

[75] Inventors: Alan R. Hannan; Thomas M. Nickolin, both of Cincinnati; Ted W. Lewis, Sardinia, all of Ohio

[73] Assignee: KDI Precision Products, Inc., Cincinnati, Ohio

[ * ] Notice: This patent is subject to a terminal disclaimer.

[21] Appl. No.: 09/044,419

[22] Filed: Mar. 19, 1998

Related U.S. Application Data

[63] Continuation-in-part of application No. 08/824,046, Mar. 21, 1997, which is a continuation of application No. 08/328,679, Oct. 25, 1994, abandoned, which is a continuation-in-part of application No. 08/143,834, Oct. 27, 1993, Pat. No. 5,406,843.

[51] Int. Cl.⁷ ..................................................... G01F 23/26
[52] U.S. Cl. ........................... 73/304 C; 324/658; 702/55
[58] Field of Search ........................ 73/304 C; 324/658, 324/665; 340/618, 620; 702/52, 55

[56] References Cited

U.S. PATENT DOCUMENTS

| | | |
|---|---|---|
| 2,519,668 | 8/1950 | Konigsberg . |
| 2,544,012 | 3/1951 | Edelman . |
| 2,621,517 | 12/1952 | Sontheimer . |
| 2,638,000 | 5/1953 | Sontheimer . |
| 2,648,058 | 8/1953 | Breedlove . |
| 2,651,940 | 9/1953 | Kline . |
| 2,751,531 | 6/1956 | Barrett . |
| 2,866,337 | 12/1958 | Minneman et al. . |
| 2,868,015 | 1/1959 | Haropulos . |
| 3,343,415 | 9/1967 | Johnston . |
| 3,391,547 | 7/1968 | Kingston . |
| 3,534,606 | 10/1970 | Stamler et al. . |
| 3,552,209 | 1/1971 | Johnston . |
| 3,620,080 | 11/1971 | Ryder . |
| 3,935,739 | 2/1976 | Ells . |
| 4,086,528 | 4/1978 | Walton . |
| 4,145,927 | 3/1979 | Larson .................................. 73/304 C |
| 4,173,893 | 11/1979 | Hedrick . |
| 4,235,106 | 11/1980 | Maltby et al. . |
| 4,258,422 | 3/1981 | Dougherty et al. . |
| 4,266,144 | 5/1981 | Bristol . |
| 4,350,039 | 9/1982 | van Dyke et al. . |
| 4,417,473 | 11/1983 | Tward et al. . |
| 4,418,571 | 12/1983 | Asmundsson et al. ............... 73/304 C |
| 4,470,008 | 9/1984 | Kato . |
| 4,499,766 | 2/1985 | Fathauer et al. . |
| 4,545,020 | 10/1985 | Brasfield . |
| 4,553,434 | 11/1985 | Spaargaren . |
| 4,589,077 | 5/1986 | Pope . |

(List continued on next page.)

FOREIGN PATENT DOCUMENTS

| | | |
|---|---|---|
| 2 662 249 | 5/1990 | France . |
| 58-123431 | of 1982 | Japan . |
| 748138 | 6/1978 | Russian Federation . |
| 2 066 961 | 7/1981 | United Kingdom . |

*Primary Examiner*—Andrew H. Hirshfeld
*Attorney, Agent, or Firm*—Harness, Dickey & Pierce, PLC

[57] ABSTRACT

A digital liquid level sensing apparatus for detecting variations in the dielectric of a substance being sensed, to thereby provide a signal indicative of the level of the liquid being sensed in relation to a known full level. The apparatus includes a reservoir having an output plate and an input plate assembly associated therewith. The input plate assembly includes a plurality of independently electrically excitable input plates which transmit a signal through the liquid being sensed to the output plate. The signals from the output plate are processed and a determination is made as to the level of liquid in the reservoir relative to a known full level. If the input plate assembly is located against the exterior surface of one wall of the reservoir, then both of the interior and exterior portions of that particular wall should be devoid of any metallic surface. In an alternative embodiment, a discardable interior reservoir is provided which fits nestably within the reservoir of the sensor. The interior reservoir is particularly useful for measuring water-based bodily fluids such as urine, where it may be desirable to discard just the reservoir after use.

12 Claims, 7 Drawing Sheets

U.S. PATENT DOCUMENTS

| | | |
|---|---|---|
| 4,676,101 | 6/1987 | Baughman . |
| 4,780,705 | 10/1988 | Beane . |
| 4,806,847 | 2/1989 | Atherton et al. ............... 73/304 C |
| 4,841,227 | 6/1989 | Maier . |
| 4,864,857 | 9/1989 | Koon .......................... 73/304 C |
| 5,045,286 | 9/1991 | Kitajima et al. ............... 73/304 C |
| 5,138,880 | 8/1992 | Lee et al. . |
| 5,142,909 | 9/1992 | Baughman . |
| 5,245,873 | 9/1993 | Fathauer et al. ............... 73/304 C |
| 5,423,214 | 6/1995 | Lee ............................ 73/304 C |
| 5,477,727 | 12/1995 | Koga ......................... 73/304 C |
| 5,554,937 | 9/1996 | Sanders et al. ................ 73/304 C |

DIGITAL LIQUID LEVEL SENSING APPARATUS

CROSS-REFERENCE TO RELATED APPLICATIONS

The present application is a continuation-in-part application of U.S. patent application Ser. No. 08/824,046, filed Mar. 21, 1997, presently pending, which is a continuation of U.S. application Ser. No. 08/328,679, filed Oct. 25, 1994, presently abandoned, which is a continuation-in-part of U.S. application Ser. No. 08/143,834, filed Oct. 27, 1993, now U.S. Pat. No. 5,406,843.

BACKGROUND OF THE INVENTION

1. Technical Field

This invention relates to liquid level sensors, and more particularly to a digital liquid level sensing apparatus incorporating a dielectric constant differentiator for detecting the level of a liquid substance within a fluid reservoir.

2. Discussion

Liquid level sensors are used in a variety of applications to sense fluid levels in reservoirs where it is important or desirable to periodically or continuously monitor the level of the fluid within a reservoir. One form of liquid level sensor employs a capacitive probe having a pair of continuous, elongated elements (i.e., plates) positioned on a substrate of the probe. This form of sensing system makes use of the difference in the dielectric of air from various liquids. In such systems, some means is provided for generating a signal which is applied to one plate of the probe. The overall capacitance of the capacitor formed by the two plates, and thus the magnitude of the signal coupled onto the other one of the plates on the probe, will change as the percentage of the probe submerged in a fluid, and thus the two plates thereof, changes. Thus, the magnitude of the signal coupled onto the output plate of the probe can provide a relative indication of the area of the probe which is submerged in fluid and/or exposed in air.

Many prior developed systems incorporating capacitive probe technology have involved going to great lengths to fully characterize the dielectric constant of the substance whose level is being monitored in an effort to effect an accurate measurement of the level of the substance within a given reservoir. In some instances, such approaches have involved making some form of in-situ measurement of the dielectric constant. Other approaches attempt to avoid the affects of the varying dielectric constant by attempting to remove the variation from the measurement. This is highly desirable because the dielectric constant of a given substance may vary to a significant degree when the substance experiences severe temperature changes or contamination from other substances which enter the reservoir. Thus, the overall accuracy of many such liquid level sensing systems incorporating capacitive probe technology can be greatly adversely affected by changes in the dielectric constant of the substance being measured as the composition of the subject is subjected to various environmental factors (e.g., temperature) and as the composition of the substance varies over a period of time.

One application where liquid level sensors are particularly desirable is with automotive vehicles. Recently there has been increasing interest in monitoring an even greater number of different fluids associated with motor vehicles to ensure that such fluids remain at optimum levels. For example, there has been increasing interest in incorporating sensing apparatus for sensing engine coolant levels, transmission fluid levels and differential case fluid, just to name a few. The use of liquid level sensing apparatus with such fluids, however, presents a number of problems due to the extreme environmental changes which such a sensing apparatus must be able to tolerate, as well as the cost constraints which must be met in order for the apparatus to be economically mass produced without adding significantly to the overall price of the vehicle.

Recently released requirements, typical of the auto industry at large, for a fuel oil level sensor are listed below to provide an idea of the stringency of present day operational parameters which such a level sensor suitable for use in automotive applications must meet:

A. Temperature Range - (−)40° C. to 150° C.
B. Life - 20 Years
C. Response Time - preferably in the area of about or reasonably close to 15 milliseconds
D. Accuracy - 0.5 gallons minimum
   - 0.1 gallons preferred
E. EMI/RFI - Must be operational in close proximity to fuel pump
F. Fuel Tolerance - Sensor must be capable of meeting accuracy requirements for the following fuel types:
   TF1
   TF2
   UNLEADED GASOLINES
   100% INDOLENE HO-III
   PEROXIDE FUEL MIX
   METHANOL FUEL MIX
   CORROSIVE GASOHOL
   Additionally, the sensor must be capable of limited exposure to 2 RVP Fuel as well as not being adversely affected by exposure to legal and commercial fuels in the Asian, Mideast and European markets.
G. Underbody Contaminants - The sensor must withstand prolonged exposure to the following list of potential underbody contaminants:

| | |
|---|---|
| Engine Oil | Transmission Fluid |
| Power Steering Fluid | Coolant/Antifreeze |
| Brake Fluid | Windshield Wash Fluid |
| Transaxle/Differential Lube | Wheel Bearing Lube |
| Water | A/C Refrigerant |
| Snow, Ice | Acid Rain |
| Car Wash Chemicals | Waxes, Paint Sealants |
| Steam Cleaning | Tire Cleaners |
| Engine Cleaning | Carpet Cleaners |
| Soft Drinks, Coffee, Etc. | |

H. Space/Size Requirements - The sensor shall be contained preferably reasonably close to the following form factors:
   15 × 4 × 175 MM         15 × 4 × 400 MM
   10 × 6 × 175 MM         10 × 6 × 400 MM
I. Electrical Requirements -
   Operational Voltage: 10.5 to 16.5 volts
   Output voltage: 0 to 4.8 volts linearly related to measured level.
J. Mechanical Requirements - Sensor must survive a three feet vertical drop and still meet the electrical requirements.

As mentioned above, to be suitable for use in automotive applications any liquid level sensor must meet the above requirements in addition to being capable of manufacture at a relatively low cost. This places an additional constraint on the design of the liquid level sensing system. In summary then the fluid level sensing system must accurately measure a variety of materials (i.e., fluids) in a hostile environment as well as being capable of economical manufacture.

Another industry in which the use of level sensors is very advantageous is the medical industry. In the medical industry, and more particularly in hospitals, nursing homes and other health care facilities, it is desirable to employ liquid level sensing systems for monitoring various fluids. For example, a urometer must gauge the level of urine output of a patient. Other applications might involve the application of fluids to a patient via an intravenous fluid mechanism.

In the urometer application mentioned above, it is highly desirable not to be required to re-use any component of a liquid level sensing system which is physically disposed in the urine. Such would require the apparatus disposed in the urine to be periodically cleaned or handled. Accordingly, it would be highly desirable to provide some form of liquid level sensing system that could be used in applications where it is undesirable to handle portions of the sensor apparatus which have come into contact with various fluids, such as urine, and where a relatively inexpensively constructed portion of the sensing apparatus which is physically in contact with the liquid being measured is disposable with the fluid container. Alternatively, it would be highly desirable if the urometer included a liquid level sensing portion which could be quickly and easily detached from a reservoir portion and adapted to sense the level of urine in the reservoir without any component of the liquid level sensing portion making physical contact with the urine. It would further be desirable if just the reservoir portion could be discarded after use and the liquid level sensing portion re-used with a new reservoir thereafter.

Accordingly, it is a principal object of the present invention to provide a liquid level sensing apparatus incorporating a capacitive probe which senses the level of a liquid within a reservoir within which the capacitive probe is placed and which provides a sufficiently high level of accuracy which is not affected by changes in the dielectric constant of the substance being monitored.

It is another object of the present invention to provide a liquid level sensing apparatus which detects the level of a liquid within a fluid reservoir by detecting significant changes in the capacitance of a capacitive sensing probe having a plurality of segmented capacitors formed longitudinally thereon along an axis of measurement of the probe.

It is still another object of the present invention to provide a liquid level sensing apparatus capable of differentiating the dielectric constant of a substance at a plurality of points along a segmented capacitive probe disposed in the substance to thereby provide the capability of determining not only the point at which the capacitive probe becomes disposed in air, but also changes in the dielectric constant of the substance.

It is yet another object of the present invention to provide a liquid level sensing apparatus which is suitable for use with a urometer to sense urine output.

It is still another object of the present invention to provide a liquid level sensing apparatus which is highly suitable for use in connection with a urometer, and which includes a relatively inexpensively constructed portion thereof which is adapted to be placed into the urine held in a reservoir thereof and thereafter discarded when the urometer is to be used on a new patient. In this manner, the apparatus would not require any cleaning or extended handling by health care personnel such as nurses or doctors. The urometer apparatus would also not require extensive disassembly or maintenance, but rather would be adapted to allow a new sensing element of the level sensing apparatus to be used without the above-mentioned drawbacks.

It is still another object of the present invention to provide a liquid level sensing apparatus which is economical to manufacture and suitable for use in hostile environments such as those encountered in various fluid reservoirs on a motor vehicle, or those present in medical applications such as with urometers, and which meets or exceeds industry operating requirements.

SUMMARY OF THE INVENTION

The above and other objects are provided by a digital liquid level sensing apparatus in accordance with preferred embodiments of the present invention. The apparatus includes a segmented capacitive probe having a plurality of independent input plates positioned longitudinally thereon along an axis of measurement of the probe and a common output plate having a length sufficient to span the total length of the input plates. The input plates are coupled to a plurality of independent outputs of a controller. The controller generates a plurality of sequential output signals to electrically excite each of the input plates one plate at a time. As each input plate is electrically excited it causes an output current to be coupled onto the common output plate. The magnitude of the output current depends on the capacitance, which in turn depends on the dielectric constant of the substance between the excited input plate and the common output plate.

The common output plate is coupled to means for converting the current output to a corresponding voltage. In the preferred embodiments this current converting means is comprised of a current to voltage amplifier. The current to voltage amplifier generates a voltage signal having a magnitude which "tracks" the output current coupled onto the common output plate and generates a series of voltage signals representative of the output currents generated as each input plate is electrically excited by the controller. A peak voltage detector receives each of the voltage signals and generates a peak voltage signal therefrom representative of the peak level of the output current coupled onto the common output plate from each one of the input plates.

Each of the peak voltage signals is applied to an input of the controller which compares the peak voltage signals generated on the common output plate from any given input plate with a predetermined reference value stored in a first memory of the controller. Accordingly, the controller performs a plurality of comparisons, sequentially, of the output signals caused from the excitation of each input plate.

In the preferred embodiments each of the peak voltage output signals are converted into a digital representation by an analog-to-digital (A/D) converter of the controller and stored in a second memory of the controller. In the preferred embodiments the predetermined reference value may be calculated from a reference input plate, such as an input plate which is disposed in air even when the reservoir is full of fluid. Alternatively, this value may be a predetermined value which is stored in a read only memory of the controller, or alternatively in external memory such as an electrically erasable, programmable read only memory along with other historical information relating to each particular input plate. One or more additional reference values relating to completely submerged input plates may also be stored in the above-mentioned memories.

An appropriate program controls the comparisons between the output signals generated at the output plate from each of the input plates such that the output signal corresponding to each one of the input plates is subsequently compared against the reference value. The percentage coverage of any partially submerged plate(s) is also rationalized by the controller from the one or more stored reference values. In this matter the controller can detect even extremely small differences in the output signals resulting from excitation of any particular one of the input plates. Accordingly, even input plates which are only partially submerged in fluid cause an output signal which reflects this condition, and which can be readily detected by the controller. Thus, the fluid-air interface can be readily and accurately determined. Variations in the dielectric of the fluid being sensed further do not adversely affect the detection of the fluid-air interface.

In alternative preferred embodiments the apparatus includes an integrator circuit for receiving an output signal from the controller representative of the total coverage of the capacitive plates of the probe in fluid, and for providing an analog output signal indicative of the overall fluid level within the reservoir. In another alternative preferred embodiment the apparatus includes a bi-directional serial interface for enabling bi-directional communication between the controller and any external serial device. The controller of the apparatus may also optionally include means for generating a low level output signal when the sensed fluid level falls below a predetermined minimum level.

In an alternative preferred embodiment of the present invention, the liquid level sensing apparatus is used in connection with a urometer for measuring urine output. In this embodiment one plate is disposed within the interior of a urine reservoir, while the other plate of the apparatus is disposed closely adjacent the exterior surface of the reservoir. Accordingly, only one plate physically rests within the urine collected in the reservoir.

In the above-mentioned urometer application, the capacitive plate disposed within the reservoir is the common output plate of the sensor apparatus. The input plates and processor are disposed on a processor/input plate circuit board assembly which is positioned outside of the reservoir but adjacent the wall of the reservoir so as to be closely adjacent the common output plate. The processor/input plate printed circuit board assembly is removably securable to the exterior of the reservoir of the urometer in a manner which allows it to be quickly coupled to the reservoir and uncoupled therefrom. When coupled to the reservoir, the processor/input plate circuit board is electrically coupled to the common output plate via a plurality of conductors which are formed within mounting portions of the reservoir which allow the common output plate to be mounted to the interior of the reservoir. The mounting portions take the form of standoffs which allow the common output plate to be spaced relatively precisely from the interior of the reservoir wall which separates the common output plate from the processor/input plate circuit board. With this arrangement, once the reservoir needs to be changed, the processor/input plate circuit board is simply uncoupled from the exterior of the reservoir and the entire reservoir and common output plate disposed therein may be discarded. In this manner there is no handling or cleaning required of the common output plate when it is desired to dispose of the urine reservoir.

In another alternative preferred embodiment of the present invention, the liquid level sensing apparatus thereof is adapted to be used in connection with a urometer in a manner which does not require either the processor/input plate assembly or the common output plate to be disposed when the apparatus is to be used to monitor the urine output of a new patient. In this embodiment a reservoir is formed within which two upstanding hollow columns extend upwardly from a bottom surface of the reservoir. In one of the hollow columns is placed a portion of the processor/ input plate assembly such that at least a portion of the input plates thereof are disposed below an upper edge of the first hollow column. The common output plate is disposed within the second one of the hollow columns such that at least a portion of it is disposed below an upper edge of the second hollow column. The hollow columns are further spaced apart slightly by a predetermined distance such that urine collected within the reservoir can easily flow between the two columns.

With this described arrangement, when it is desired to dispose of the reservoir, the entire processor/input plate assembly and common output plate are removed together as a single assembly from the two hollow columns and the entire reservoir may be disposed of. Accordingly, there is no need to dispose of one or the other of the capacitive plates of the apparatus when the urometer is to be used with a new patient.

In yet another alternative preferred embodiment of the present invention, a liquid level sensor is employed which incorporates a reservoir having an interior surface which is almost completely covered with a metallized coating which forms an output plate, and an exterior surface which is either completely covered or substantially covered with a separate metallized coating which forms a ground plate. A plurality of independent input plates of an input plate assembly are positioned adjacent the interior wall of the reservoir in the area which is devoid of the metallized material forming the output plate. A second reservoir for containing the fluid to be measured has dimensions permitting it to be inserted within the interior area of the first reservoir.

Due to the high electromagnetic conductivity (i.e., dielectric constant) of water-based substances, the spacing between the metallized surface forming the output plate and the input plates can be increased. Also, the input plates and the metallized surface forming the output plate need not be orientated generally parallel to one another because the water-based fluid can develop an electromagnetic field and carry the electromagnetic energy to the metallized surface forming the output plate. By substantially covering the outer surface of the first reservoir with a metallized material to form a ground plate, the metallized surface forming the output plate can be shielded from extraneous electromagnetic interference which might otherwise compromise the integrity and accuracy of the readings provided by the sensor.

In an alternative preferred embodiment, the interior wall of the reservoir includes an elongated portion or area which is not covered by a metallized surface and a portion of the exterior surface of the reservoir similarly includes an elongated area in alignment with the elongated area on the interior surface which also does not include a metallized surface. Accordingly, both the interior and exterior surfaces have an overlapping, elongated area which are not covered by any metallized surface, and which therefore allow a visual inspection of the interior of the reservoir.

In still another alternative preferred embodiment particularly well adapted for measuring human bodily fluids, an exterior non-disposable reservoir is provided which includes an interior surface which is substantially covered with a metallized material to form an output plate, and an exterior surface which is substantially covered with a metallized material to form a ground plate. A disposable reservoir having dimensions enabling it to fit nestably within the non-disposable reservoir is provided for containing fluids. After a measurement is made, the entire disposable container may be disposed and a new disposable container inserted within the non-disposable reservoir. In this manner the fluids never contact the metallized surface forming the output plate of the assembly. In this embodiment an input plate assembly is disposed on the exterior surface of the non-disposable reservoir such that the plurality of input plates thereof also do not come in contact with the fluid being measured.

While the preferred embodiments of the present invention are particularly well adapted for use with medical applications and automotive vehicle applications, it will be appreciated that the invention could be used in connection with the sensing of virtually any liquid substance as well as a variety of solid substances such as granular or plate type substances. Applications of the apparatus are further not limited to level sensing but could just as easily include position indicating systems and dielectric constant testing systems. The preferred embodiments of the apparatus provide a relatively low cost, low power consumption apparatus for effectively differentiating dielectric strengths and for accomplishing accurate liquid level sensing.

In yet another alternative preferred embodiment, the apparatus of the present invention incorporates a temperature probe which senses temperature changes in the fluid in which the capacitive plates of the probe are disposed. Changes in the dielectric constant of the fluid due to temperature changes can thereby be factored into the determination of the percentage of coverage of any particular input plate. This further increases the accuracy of the liquid level determination.

BRIEF DESCRIPTION OF THE DRAWINGS

The various advantages of the present invention will become apparent to one skilled in the art by reading the following specification and subjoined claims and by referencing the following drawings in which:

FIG. 3 is a more detailed electrical schematic diagram of the apparatus of FIG. 1;

DETAILED DESCRIPTION OF THE PREFERRED EMBODIMENTS

Figure 1:
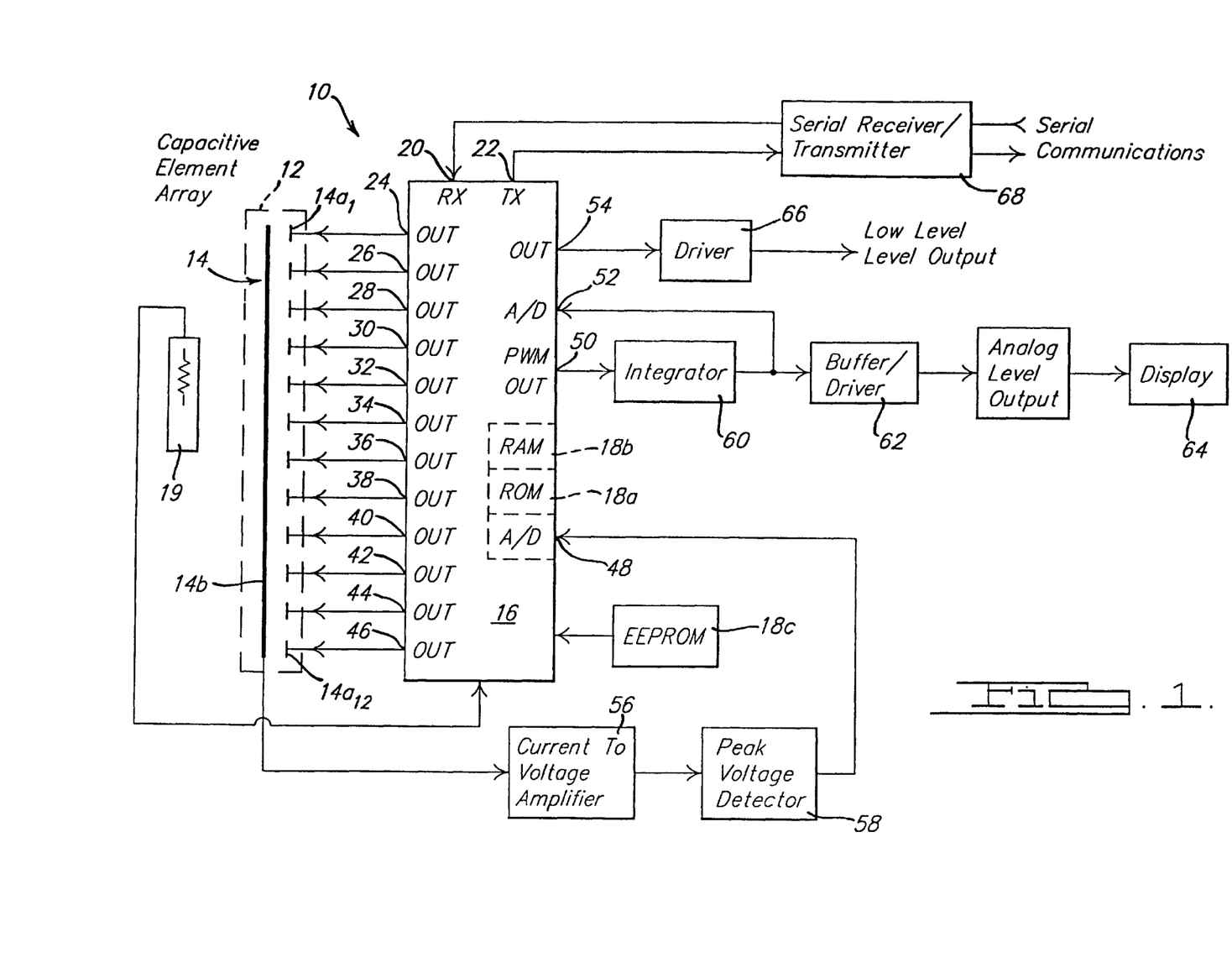
FIG. 1 is a block diagram of a digital liquid level sensing apparatus in accordance with a preferred embodiment of the present invention, and, also showing several optional, yet desirable, circuit components for implementing various optional functions.

Referring to FIG. 1, there is shown a block diagram of a digital liquid level sensing apparatus 10 in accordance with a preferred embodiment of the present invention. The apparatus 10 generally includes a capacitive element array 14 which is disposed on a substrate 12. The array 14 includes a plurality of input plates $14a_1$–$14a_{12}$ and a common output plate 14b. The output plate 14b has a length which is sufficient to span the entire length of the adjacently positioned input plates $14a_1$–$14a_{12}$ and both the common output plate 14b and plurality of input plates $14a_1$–$14a_{12}$ are disposed longitudinally along an axis of measurement of a fluid to be measured within a fluid reservoir.

Each of the input plates $14a_1$–$14a_{12}$ of the capacitive element array 14 are coupled to independent outputs of a controller 16. In the preferred embodiments the controller comprises a microcontroller having a read-only memory (ROM) 18a and a random access memory (RAM) 18b the function of each of which will be described momentarily. It will be appreciated, however, that one or more external memory devices may be used in lieu of the memory devices 18a and 18b if for some reason this is desirable to meet the needs of a particular application. In another preferred embodiment an electrically erasable, programmable, read-only memory (EEPROM) 18c is used for storing reference values for each input plate $14a_1$–$14a_{12}$. In connection with this embodiment an optional temperature sensor 19 may also be incorporated to provide indications of changes in temperature of the fluid in which the array 14 is disposed, which in turn can indicate changes in the dielectric constant of the fluid. By taking into account the changes in the dielectric constant due to temperature, an even more accurate determination can be made as to the percentage coverage of each input plate $14a_1$–$14a_{12}$.

In the preferred embodiments the controller 16 comprises a SGS microcontroller which includes serial communications ports RX 20 and TX 22, and a plurality of output ports 24–46 which are electrically coupled to the input plates $14a_1$–$14a_{12}$. The controller 16 further includes a first analog-to-digital input 48 in communication with an internal analog-to-digital (A/D) converter, a pulse width modulated (PWM) output 50, a second analog-to-digital input 52 and an output port 54.

The common output plate 14b of the capacitive element array 12 is coupled to an input of a current to voltage amplifier 56. The amplifier 56 has its output coupled to an input of a peak voltage detector circuit 58. The output of the peak voltage detector circuit 58 is in turn coupled to the A/D input 48 of the controller 16.

The PWM output 50 of the controller 16 is coupled to an integrator circuit 60. The output of the integrator 60 is in turn coupled to a buffer/driver circuit 62 which generates an analog output level signal to an external analog display device 64. The output of the integrator 60 is shown being coupled back to the A/D input 52 of the controller 16 such that a digital signal can be developed representative of the analog level output signal from the integrator 60. While circuit 60 has been referred to for convenience as an "integrator" circuit, it will be appreciated that this circuit in fact forms a low pass filter with a cut-off frequency far below the repetition rate of the PWM output 50. This causes the circuit to function as an "averaging" circuit with an output voltage equal to the pulse amplitude times the ratio of the pulse width/repetition rate.

The output 54 of the controller 16 is coupled to an optional driver circuit 66 for generating a low fluid level warning output signal. Thus, if the controller 16 determines that the detected fluid level is below a predetermined lower limit, the controller 16 generates a signal on output port 54 which driver circuit 66 uses to generate a warning to an operator of a vehicle or other system with which the apparatus 10 is being used that a particular fluid level is below an acceptable lower limit. While this function of the controller 16 is optional, it is expected at the present time that it will be desirable in many applications, and particularly in those involving automotive vehicles, where it is desirable to provide a warning to an operator of the vehicle immediately if a particular fluid level drops below a predetermined lower limit.

The signal from output port 54 is particularly useful in connection with sensing the level of oil in an oil reservoir of a vehicle. In automotive applications, it is important that the oil level within the oil pan of the vehicle not be allowed to fall below a minimum predetermined level. If such an event occurs, it is very important that the operator of the vehicle be notified immediately by some visual or audible means.

The controller 16 is bi-directionally coupled to a serial receiver/transmitter circuit 68 via the RX and TX outputs 20 and 22, respectively. The serial receiver/transmitter circuit 68 essentially comprises a serial interface circuit which allows the controller 16 to communicate with another external controller, such as an engine control module of an automotive vehicle, to thereby enable a signal representative of the sensed fluid level to be communicated to the external device and other information to be communicated to the controller 16.

Figure 2:
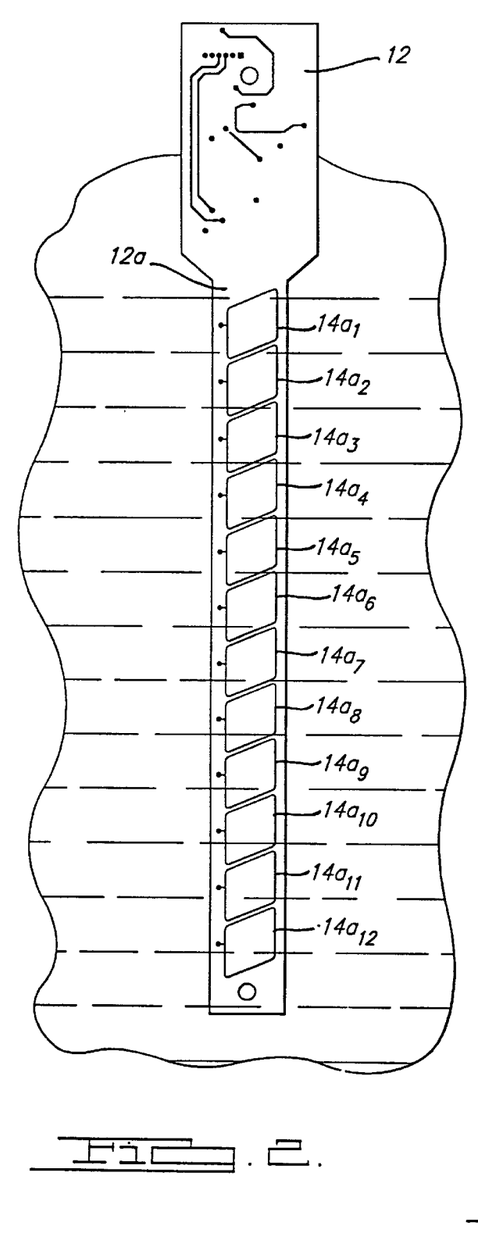
FIG. 2 is an illustration of the capacitive probe showing an exemplary form which the substrate may take and the overlapping of the input plates.

Referring to FIG. 2, the apparatus 10 is disposed on the substrate 12 such that the capacitive element array 14 is disposed on an elongated portion 12a of the substrate 12 within the fluid when positioned in a reservoir. It is anticipated that in most instances all the input plates $14a_1$–$14a_{12}$ will be disposed in fluid when the reservoir is completely full. In the preferred embodiments the input plates $14a_1$–$14a_{12}$ are each formed in the shape of a parallelogram and positioned such that portions of adjacent ones of the plates overlap slightly. This provides plate surfaces along the entire length of the input plates, thus eliminating the "gaps" that would otherwise exist between adjacent input plates $14a_1$–$14a_{12}$.

Referring again to FIG. 1, a description of the operation of the apparatus 10 will now be provided. Initially, the ROM 18a of the controller 16 will include a predetermined "air plate" reference value corresponding to the output current coupled onto the common output plate 14b when any input plate is disposed in air. A predetermined "full plate" reference value will also be stored in the ROM 18a corresponding to an approximate expected output from the output plate 14b produced from exciting an input plate which is completely submerged in fluid.

The controller 16 sequentially applies a very short duration DC voltage pulse to each one of the input plates $14a_1$–$14a_{12}$, one at a time. For example, when the input DC pulse is applied to input plate $14a_2$, an output current is coupled onto the common output plate 14b. The output current will vary in magnitude depending on the capacitance of the capacitor formed between input element $14a_2$ and common output plate 14b. Since the dielectric of air differs significantly from that of liquids, if the input plate $14a_2$ happens to be disposed in air the output current coupled onto the common output plate 14b will be of a lower magnitude than the current that would be coupled thereon if the input plate $14a_2$ had been submerged in liquid. Thus, the output current coupled onto the common output plate 14b as a result of the input signal applied to each one of the input plates $14a_1$–$14a_{12}$ provides an indication as to whether a particular input plate $14a_1$–$14a_{12}$ is disposed in air, submerged in fluid, or at least partially disposed in fluid.

The controller 16 applies the DC input excitation pulses to the input elements $14a_1$–$14a_{12}$ sequentially such that a series of independent output currents are coupled onto the common output plate 12 and input to the current-to-voltage amplifier 56. In some instances each of the input plates $14a_1$–$14a_{12}$ may not need to be pulsed one at a time. For example, a fast response time algorithm may be used to pulse three of the input plates virtually simultaneously once a partially submerged plate is discovered to thereby allow a plurality of outputs from a corresponding plurality of input plates to be "tracked."

Amplifier 56 generates a series of independent analog voltage signals which each represent the output current coupled onto the output plate 14b by a particular one of the input plates $14a_1$–$14a_{12}$. It is important to note that the common output plate 14b is not allowed to change its voltage potential while input pulses are independently applied to each of the input plates $14a_1$–$14a_{12}$. A changing voltage on the common output plate 14b could potentially cause measurement errors due to current coupling onto other capacitors and other stray parasitic capacitances.

The peak voltage detector circuit 58 generates a series of peak voltage signals which represent the output signals coupled onto the common output 14b as a result of excitation of each one of the input plates $14a_1$–$14a_{12}$. The controller 16 converts these peak voltage signals into a series of corresponding digital values and stores same in the RAM 18b. The controller 16 then, through the control of appropriate software, develops a table of differences from the output currents caused by excitation of all of the input elements $14a_1$–$14a_{12}$. Put differently, a table of digital values is produced corresponding to the outputs generated by exciting the input plates $14a_1$–$14a_{12}$. The controller 16, through its software, then proceeds to compare the differences of the digital output values produced by the input plates $14a_1$–$14a_{12}$ with the previously stored "air plate" and "full plate" reference values. The software program looks for a predetermined, significant difference in the magnitude of the output signal caused by each input plate when compared to the air plate reference value. When the controller detects a predetermined significant difference between a digital value and the air plate reference value, this is an indication that the present digital value corresponds to an output signal generated by a specific, known input plate which is at least partially covered with fluid. As the controller 16 continues to make successive comparisons and determines additional differences between each subsequent digital value and the air plate reference value stored in the ROM 18a, it readily determines which of the input plates are completely disposed in fluid based on the degree of variation of each digital value from the air plate reference value. The percentage of coverage (i.e., submergence) of any particular input plate can then be approximated based on its comparison to the air plate reference value and the full plate reference value. Since the relative position of the apparatus 10 within the reservoir is predetermined, in addition to the shape of the reservoir and the overall volume of the reservoir, detecting the precise point along the axis of measurement at which the liquid-air interface is present allows the overall level of the liquid within the reservoir to be readily extrapolated.

It is anticipated future versions of the apparatus 10 will incorporate software enhancements to compensate for irregular geometries of the containment vessel or reservoir. A look-up table which assigns scaling values to segments according to their position along the array 14 will provide the required correction factors to compensate for odd-shaped reservoirs.

In an alternative preferred form of operation, the predetermined air plate and full plate reference values are used together with real time calculating of "average" air and full plate reference values. In this form of operation the software repeatedly calculates an average air plate value by taking the outputs produced from input plates $14a_1$–$14a_{12}$ which are determined (by comparison with the air plate reference value) to be disposed entirely in air and obtaining an average air plate reference value from these input plates $14a_1$–$14a_{12}$. Similarly, an average full plate reference value is obtained from those input plates $14a_1$–$14a_{12}$ which are determined (initially by comparison to the predetermined air plate or predetermined full-plate reference value) to be completely submerged in fluid. This is done by obtaining the average output produced by the input plates $14a_1$–$14a_{12}$ which are completely submerged in fluid. These average air plate and full plate reference values are then used to rationalize, more accurately, the percentage coverage of any partially submerged input plate $14a_1$–$14a_{12}$. This averaging may be expressed by the following formula:

$$\text{Percentage Coverage} = \frac{V \text{ measured} - V \text{ ref}_{low})}{V \text{ ref}_{high} - V \text{ ref}_{low}}$$

where V measured=measured voltage output value
where V $\text{ref}_{low}$=reference output voltage for a free air input plate; and
where V $\text{ref}_{high}$=reference output voltage for a fully submerged input plate These average reference values are repeatedly calculated, in real time, to take into account small changes in the dielectric constant of the fluid. The percentage coverage value may then be multiplied by a suitable scaling or weighing factor relating to that particular input plate's relative position in the reservoir and/or the volume of fluid in the reservoir.

In yet another preferred form of operation the EEPROM 18c is used to store actual full plate and air plate reference values for each single input plate $14a_1$–$14a_{12}$. These actual reference values are repeatedly updated during operation such that when a particular input plate $14a_1$–$14a_{12}$ is determined to be at least partially submerged, its percentage of submergence can be even more accurately determined. If the temperature sensor 19 is used with this embodiment, then the controller 16 can further modify the actual air plate and full plate reference values in accordance with changes in the temperature of the fluid, which temperature changes can affect the dielectric constant of the fluid. To this end a suitable look-up table stored in some memory of the apparatus 10 could be accessed by the controller 16 to obtain appropriate correction factors to be applied based on specific changes in the sensed temperature.

Referring to FIG. 3, a more detailed schematic diagram of the apparatus 10 is shown. In the drawing of FIG. 3 a second capacitive output plate 14c is included on the substrate 14. This output plate 14c is maintained at ground and, in effect, a shield to protect the common output plate 14b from noise currents by shunting any such currents to ground, for systems using a common ground. Preferably, the printed circuit board upon which the apparatus 10 is disposed has an internal ground plane to further eliminate noise transfer.

With further reference to FIG. 3, the current to voltage amplifier 56 comprises an operational amplifier 56a incorporating a feedback resistor R1 coupled to its inverting input to thereby provide a negative feedback loop. Its value is determined based on initial open plate (i.e., an input plate in air) capacitance. Resistors R6 and R3 form a voltage divider for generating a suitable input voltage to the non-inverting input of the operational amplifier 56a. It should be noted that a desirable characteristic of the amplifier 56 is that its output voltage is only affected by input elements which source or sink current from the inverting node (input) of the operational amplifier 56a, which is at virtual ground potential. Since the output plate 14b is tied to this input, many problems otherwise encountered with a common element approach are eliminated. In operation, the adverse loading effects caused by the parasitic capacitance of the un-driven input plates $14a_1$–$14a_{12}$ is ignored because of this principle.

The peak voltage detector circuit 58 is formed by diode D2 coupled in with capacitor C5. The peak detector 58 functions to capture the peak amplitude of the output pulse generated on the output plate 14b, for each input pulse generated by the controller 16, long enough for the controller 16 to read the signal with its internal A/D converter. Diode D3 prevents gain from positive currents into the amplifier 56 which would try to otherwise make the output of the amplifier 56 go negative. Alternatively, a small capacitor could be used in place of diode D3 having the same junction capacitance as diode D3. The integrator 60 of FIG. 1 is shown in FIG. 3 as being represented by resistor R5 and capacitor C6. Buffer/driver circuit 62 is represented by operational amplifier U3B and resistor R4. The driver circuit 66 is represented by resistor R6 and NPN transistor Q1. The receive (RX) port 20 and the transmit (TX) port 22 of the controller 16 are shown as ports 27 and 26, respectively, of the controller 16. A ceramic resonator 72 is coupled to the clock inputs of a controller 16 to provide a timing signal of preferably about 2–8 Mhz to the controller 16.

Figure 4:
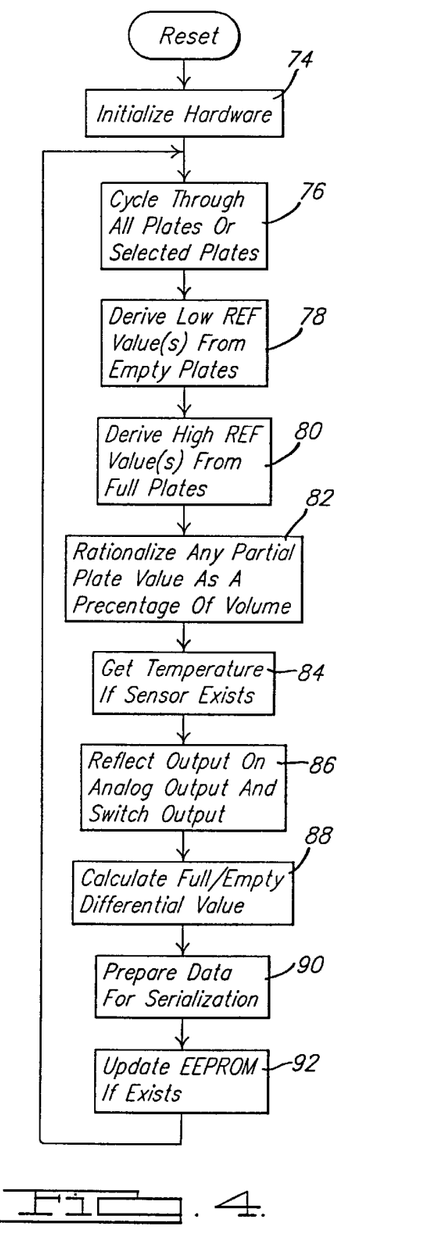
FIG. 4 is flow chart of the series of steps performed by the controller of the apparatus in detecting the presence and absence of fluid along the capacitive probe of the apparatus.

Referring now to FIG. 4, a flowchart is provided which further illustrates the steps of operation of the preferred form of operation of the apparatus 10. At step 74 the controller 16 is initialized. At step 76 the controller cycles through all, or at least a selected sub-plurality, of the input plates $14a_1$–$14a_{12}$ to obtain a digital output value associated with each input plate $14a_1$–$14a_{12}$. At step 78 the controller 16 mathematically derives the average air plate (i.e., low plate) reference value from all the input plates which are disposed completely in air. As indicated at step 80, the controller then mathematically derives the average full plate reference value from all the input plates $14a_1$–$14a_{12}$ which are completely submerged in fluid.

At step 82, the controller determines any input plate $14a_1$–$14a_{12}$ which is not entirely disposed in air or which is not completely submerged in fluid and further determines the percentage coverage of the input plate (i.e., the percentage of the plate which is submerged in fluid). The controller then reads the temperature sensor 19, if this component is being used, as indicated at step 84 and then prepares to output a signal to at least the PWM controller output 50, as indicated at step 86.

Optionally, the controller 16 may calculate the full/empty differential value between a given input plate's outputs when the input plate is completely submerged in fluid and completely disposed in air, as indicated at step 88. This provides an indication of the dielectric strength of the fluid itself.

Next, the software prepares the data obtained for serial output from port 22, as indicated at step 90. The EEPROM 18c is then updated if this component is being used, as indicated at step 92.

By differentiating the dielectric constant at segmented capacitive input elements, the apparatus 10 of the present invention lends itself well to a variety of applications wherever the dielectric strength of capacitive elements of a probe varies with the level of the substance being detected. Applications of the methodology of the present invention include fluid, gaseous and solid dielectric strength measurements. Specific applications for which the apparatus 10 is particularly well adapted include liquid and solid (granular or plate type substances) level sensing and use as a dielectric strength tester and position indicator.

Figures 5, 6:
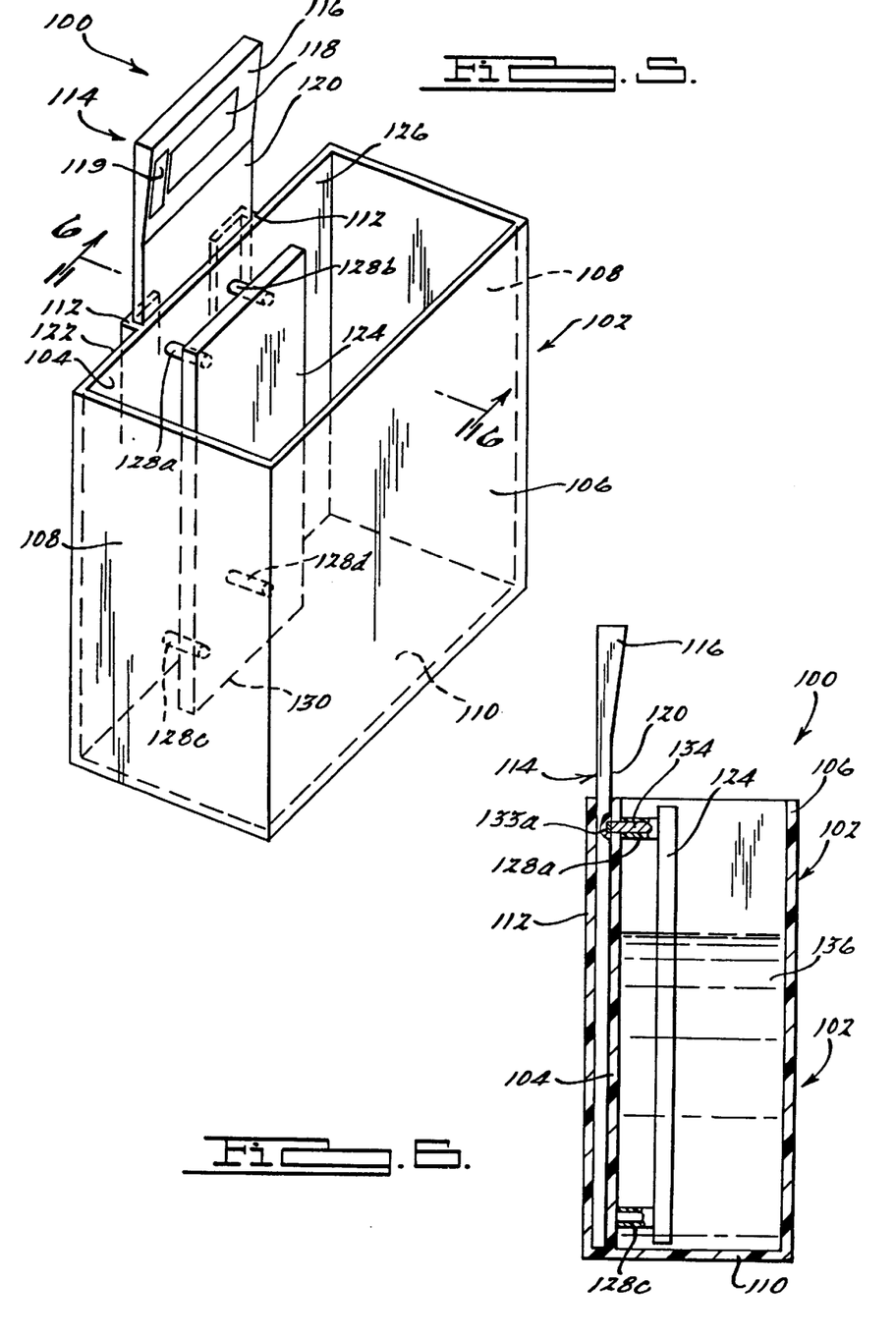
FIG. 5 is a perspective view of a urometer in accordance with an alternative preferred embodiment of the present invention.
FIG. 6 is a cross-sectional view of the urometer of FIG. 5 taken in accordance with section line 6—6 in FIG. 5.

Referring now to FIG. 5, there is shown a urometer 100 in accordance with an alternative preferred embodiment of the present invention. The urometer includes a hollow reservoir 102 adapted to hold urine therein. The reservoir 102 includes an inner side wall 104, an outer side wall 106, a pair of end walls 108 and a bottom wall 110. The walls 104–110 of the urometer 100 are preferably integrally formed to form a single-piece reservoir 102.

With further reference to FIG. 5, the inner side wall 104 further includes a pair of L-shaped shoulder members 112 each integrally formed with the inner wall 104 or secured such as by adhesives or other like means to the inner wall 104. The shoulder portions 112 are adapted to slidably receive a processor/input plate circuit board assembly 114. The assembly 114 includes a processor portion 116, preferably including a display such as a liquid crystal display 118, and an input plate portion 120. The input plate portion 120 is adapted to be held within the shoulder portions 112 abuttingly against an outer surface 122 of the inner side wall 104. The input plate portion 120 includes a plurality of input plates such as input plates $14a_1$–$14a_{12}$ of FIG. 1 and electrically communicates with the processor portion 116. A battery 119 is preferably incorporated into the processor portion so that the urometer is fully portable and not dependent on an AC power source for operation. Alternatively, the processor portion 116 may be adapted for use with an AC power source through the use of suitable rectification circuitry.

With further reference to FIG. 5, the urometer 100 includes a common output plate 124 which is physically mounted to an interior surface 126 of the inner side wall 104 so as to be disposed mostly within the reservoir 102. The common output plate 124 is spaced apart from the interior surface 126 by a plurality of standoffs 128a, 128b, 128c and 128d by a predetermined distance. In the preferred embodiment this distance is preferably between about 0.15"–0.30". The output plate 124 is further positioned within the reservoir 102 such that a lowermost edge portion 130 is disposed relatively closely adjacent an interior surface 132 of the bottom wall 110. Each of the standoffs 128a and 128b further include a conductive element disposed therein which electrically couples the common output plate 124 with the processor portion 116 of the processor/input plate assembly 114.

With reference to FIG. 6, the orientation of the common output plate 124 within the reservoir 102 can be seen together with the construction of the standoff 128a. The standoff 128a generally comprises a tubular plastic member having an electrically conductive element such as a copper wire conductor 134 extending therethrough. The electrically conductive element 134 is in electrical communication with the common output plate 124 and a conductive portion or contact 133a of the processor portion 116 of the processor/input plate assembly 114. It will be appreciated that the electrically conductive element within the standoff 128b makes electrical contact with a corresponding electrical contact (not shown) on the processor portion 116. Accordingly, the capacitive input plates of the input plate assembly 120 operate cooperatively with the common output plate 124 to allow the processor 116 to determine the level of fluid 136 within the reservoir 102 by detecting the liquid/air interface indicated by the changing dielectric constant as the liquid level within the reservoir 102 rises and falls. In this manner, the level of urine within the reservoir 102 can be quickly and reliably monitored via the display 118 of the processor portion 116.

With further reference to FIG. 6, it is a principal advantage of the present invention that the processor/input plate assembly 114 may be slidably removed from the shoulder portions 112 when it is desired to discard the reservoir 102, such as when the urometer 100 is to be used with a new patient after being previously used on a different patient. Since the contact 133a of the assembly 114 makes electrical contact with the electrically conductive element 134 as soon as the assembly 114 is slid into the shoulder portions 112, there is no need for special tools or extensive manual handling of the output plate 124 or extensive disassembly by the user. Thus, the urometer 100 can be quickly used with a new patient by simply sliding the processor/input plate assembly 114 onto a new reservoir 102 having a new output plate 124 disposed therein. Therefore, there is no need to clean any portion of the urometer 100 prior to using the urometer with a new patient.

Figure 7:
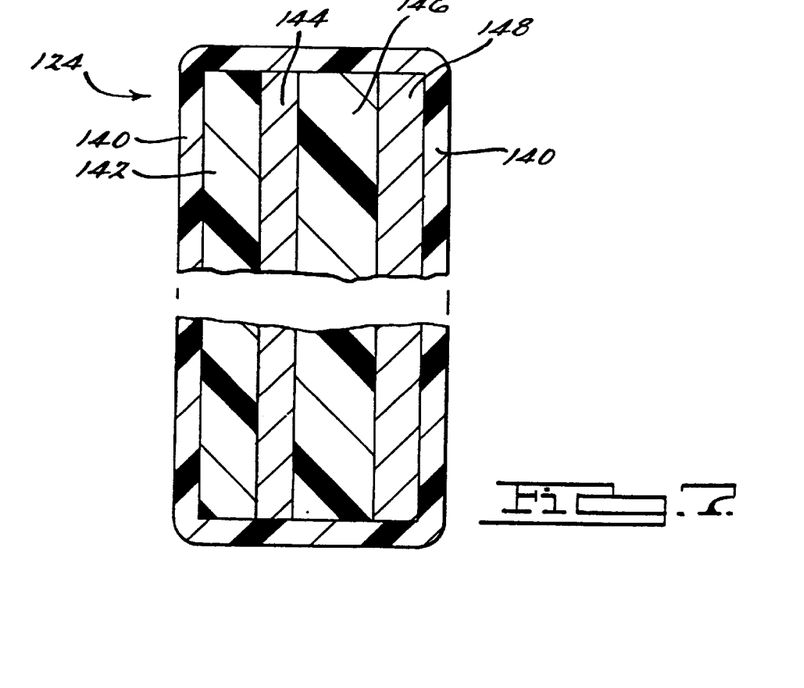
FIG. 7 is an enlarged, fragmentary, cross-sectional view of the common output plate of the urometer of FIG. 5.

Referring briefly to FIG. 7, the construction for a preferred embodiment of the output plate 124 is shown. A fluid resistant coating 140 is preferably included about the entire outer surface of the output plate 124. This coating may vary depending upon the fluids the output plate 124 is anticipated to come in contact with. When the output plate 124 is used as a component of the urometer 100, the coating 140 may comprise a suitable plastic coating. A metallized plate portion 142 is provided which may be formed of unetched copper and which is adjacent on a low dielectric constant material 144. Material 144 may comprise a plastic or printed circuit board. A second metallized portion 146 is interposed between the low dielectric strength material 144 and a similar low dielectric strength material 148 such as plastic or a printed circuit board. The second metallized portion 146 may be formed from copper and is tied to ground through the electrically conductive element disposed within the standoff 128b to thus form a "ground plane". Accordingly, a portion of the output plate 124 forms a ground plane while a portion (i.e., portion 142) forms a common capacitive output plate. With regard to the low dielectric strength material 148, it will be appreciated that this material is optional with "low dielectric" fluids. When sensing a high dielectric fluid, the fluid must be electrically isolated from the sensor or the signal from the input plates on the input plate portion 120 (FIG. 5) of the processor/input plate assembly 114 will be drawn to that source rather than to the output plate 124. Additionally, an electrical barrier must exist over the output plate 124 ground plane. This is achieved by the layer of low dielectric strength material 148 to prevent the signal submitted by the input plates from being drawn to the ground plane formed in part by the second metallized portion 146.

As will also be appreciated by those of ordinary skill in the art, with high dielectric, electrical fields present which have no reference to the sensor formed by the processor/input plate assembly 114 could cause added noise to the signals sensed. This noise will be in the form of primarily 60 Hz (50 Hz when used in European countries) noise. Adding chassis ground to the signal ground of the sensor alleviates this problem. If chassis ground cannot be tied to the processor/input plate assembly 114, appropriate filtering will most likely be required to remove this noise.

Figure 8:
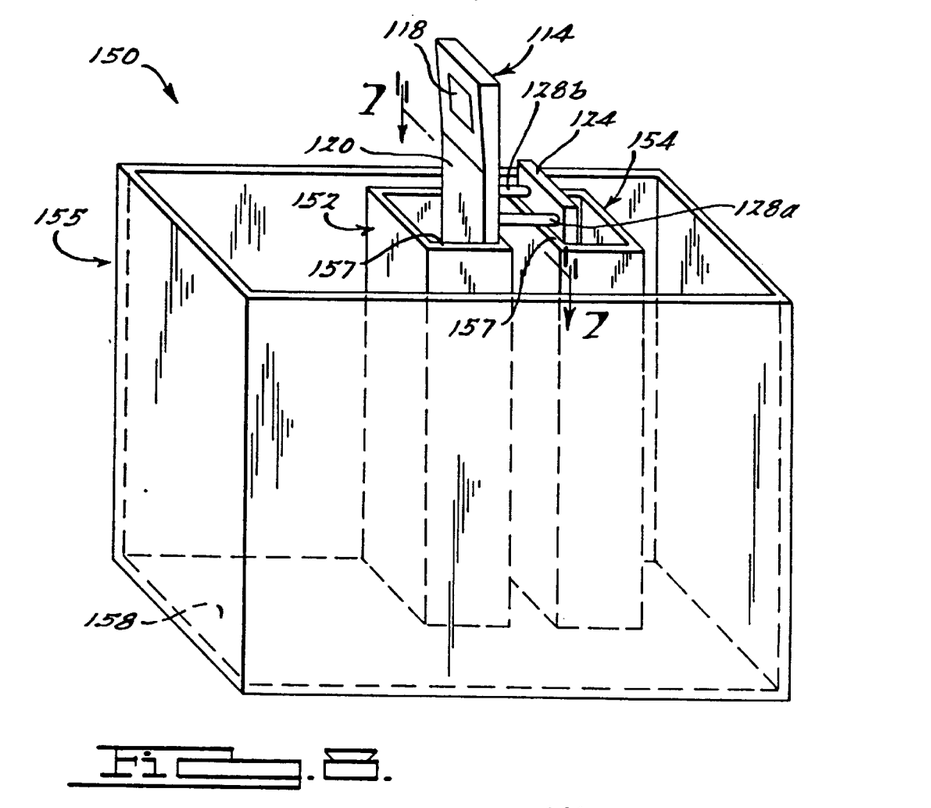
FIG. 8 is a perspective view of a urometer in accordance with an alternative preferred embodiment of the present invention.

Referring now to FIG. 8, a urometer in accordance with an alternative preferred embodiment 150 of the present invention is shown. Components common to the embodiment of FIGS. 5–7 have been indicated with reference numerals corresponding to those used in FIGS. 5–7. The urometer 150 in this embodiment includes two hollow columns 152 and 154 within which the processor/input plate assembly 114 discussed in connection with FIG. 5 is disposed. The difference with the urometer 150 is that the common output plate 124 and the standoffs 128*a* and 128*b* are coupled such that the entire assembly 114 may be withdrawn out of the two hollow columns 152 and 154, and the reservoir 155 and columns 152 and 154 disposed of when the urometer 150 is to be used with a new patient. Accordingly, there is no need to dispose of the common output plate 124 or the processor/input plate assembly 114, as neither of these components come into contact with the fluid held within the reservoir 155 due to their being isolated from the fluid by the hollow columns 152 and 154. In this embodiment, the standoffs 128*a* and 128*b* are not coupled to any interior wall portion of the reservoir 155, but rather may rest on an upper edge surface 157 of each hollow column 152 and 154, or alternatively the overall length of the output plate 124 and the processor/input plate assembly 114 such that bottom portions thereof rest on bottom inner wall portions of the hollow columns 152 and 154. The hollow columns extend down to a bottom inner surface 158 such that no fluid can enter the columns 152 and 154. The columns 152 and 154 are further spaced apart by a distance preferably within the range of about 0.15"–0.30" such that fluid is able to flow easily therebetween. Thus, the assembly 114 is able to detect the air/fluid interface level by the changing dielectric constant as the fluid within the reservoir rises between the columns 152 and 154.

It will also be appreciated that the embodiments described in connection with FIGS. 5–8 would be suited equally well with little or no modification to a wide variety of other applications involving the monitoring of fluid levels of fluids which are caustic or otherwise undesirable to handle or to have human contact with. The embodiments of FIGS. 5–8 could therefore be used in a wide variety of industrial as well as medical field applications.

Figure 9:
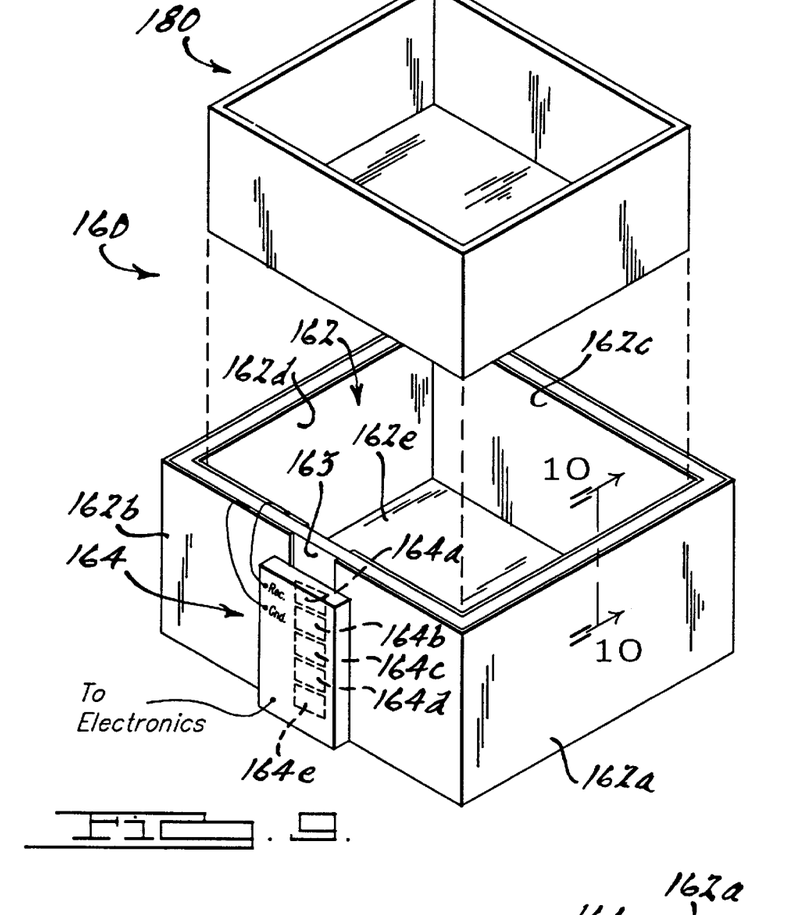
FIG. 9 is a perspective view of an alternative preferred embodiment of the liquid level sensor of the present invention with an optional interior, disposable reservoir shown in exploded perspective fashion.

Referring to FIG. 9, there is shown a liquid level sensor apparatus 160 in accordance with yet another alternative preferred embodiment of the present invention. The apparatus 160 is particularly well adapted for measuring the level of water-based liquids. The apparatus 160 may take a wide variety of geometric shapes such as a generally circular, elongated reservoir, a rectangular reservoir, etc. The only requirement is that the shape be such that it is able to contain a fluid therein. The apparatus 160 includes a reservoir 162 for holding fluids therein and an input plate assembly 164 having a plurality of input plates 164*a*–164*e* thereon. It will be appreciated immediately that a greater or lesser number of input plates 164*a*–164*e* could be included depending upon the overall height of the reservoir 162.

Figure 10:
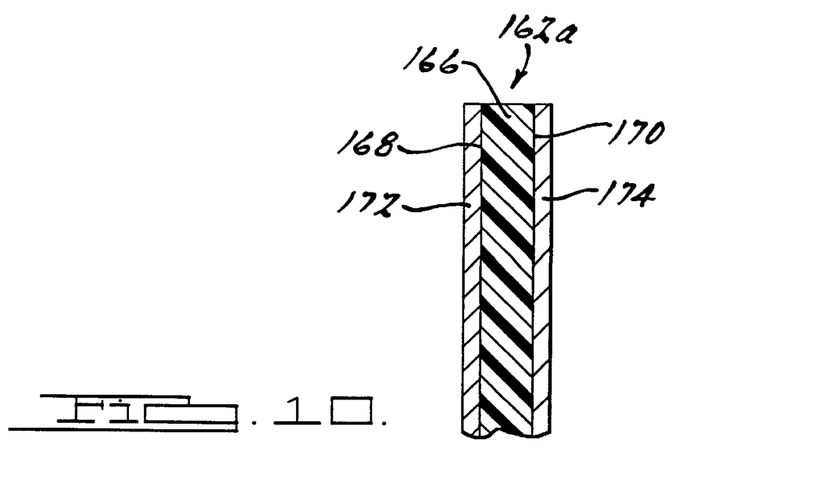
FIG. 10 is a cross sectional view of a portion of one wall of the reservoir shown in FIG. 9 in accordance with section line 10—10 in FIG. 9.
Figure 11A:
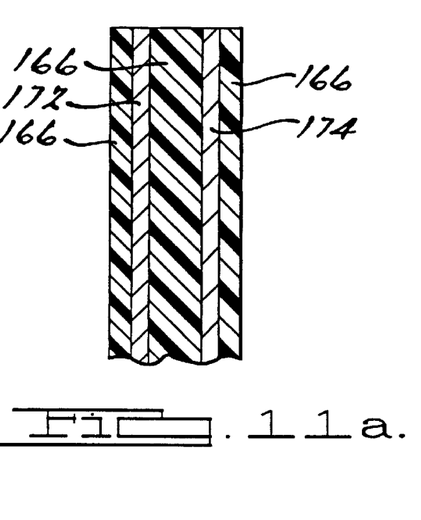
FIG. 11a is a view of one wall, in cross-section, of an alternative construction of the reservoir illustrating both the ground plate and the output plate embedded in the wall.
Figure 11B:
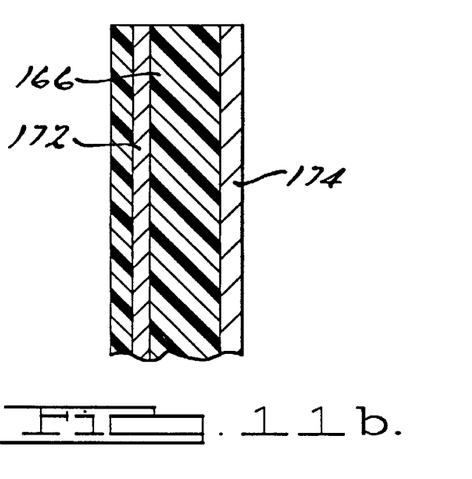
FIG. 11b is another alternative construction of the reservoir illustrating the output plate embedded in the wall and the ground plate secured to the outer surface of the wall.

With further reference to FIG. 9, the reservoir 162 includes a plurality of walls 162*a*, 162*b*, 162*c*, 162*d* and 162*e*. The walls 162 are integrally formed together as a single-piece component by molding a suitable plastic into the shape desired for the reservoir. With brief reference to FIG. 10, each of the walls 162*a*–162*e* include a plastic portion 166 having an interior surface 168 and an exterior surface 170. The interior surface 168 includes a metallic surface coating or metallic plate 172 secured thereto by adhesives or any other suitable securing means. The metallic surface 172 covers the entire area of each wall 162*a*, 162*c*, 162*d* and 162*e*, and all of wall 162*b* with the exception of an elongated strip 163 (shown in FIG. 9). Likewise, the exterior surface 170 includes a metallic surface coating 174 or metallic plate which covers the entire area of each wall 162*a*, 162*c*, 162*d* and 162*e*, and substantially all of wall 162*b* with the exception of the elongated strip 163. The input plate assembly 164 is secured over the area defined by the elongated strip 163 such that energy from the input plates 164*a*–164*e* can be radiated into and through the interior area of the reservoir 162. It will be appreciated that both of the metallic surfaces 172 and 174 could be embedded within a portion of the plastic 166 forming each wall 162*a*–162*e*, as shown in FIG. 11*a*. Alternatively, only one of the metallic surfaces 172 or 174 could be embedded in the plastic portion 166 of each wall 162*a*–162*e*, as shown in FIG. 11*b*.

Also shown in FIG. 9 is an optional, disposable, interior reservoir 180 having dimensions enabling it to fit nestably within the interior area defined by reservoir 162. Reservoir 180 is also preferably molded from plastic to form a one-piece component part which may be removed and inserted quickly and easily into the reservoir 162. Reservoir 180 is particularly advantageous for applications in the medical field such as with urometers which measure the level of urine in a container, where it is desirable not to handle the container and, even more preferable to be able to dispose of the container after use. The reservoir 180, being manufactured simply from a suitable plastic, can be manufactured inexpensively enough to permit it to be disposed of after use in a new reservoir 180 used when needed. If the reservoir 180 is used, it would be appreciated that the fluids never contact the interior area of the reservoir 162. While this arrangement is particularly advantageous for medical applications, it will be appreciated that the disposable interior reservoir 180 could be used where it is necessary to measure corrosive or aggressive water-based fluids, where contact by such fluids with the metallic surface 172 would be undesirable. Accordingly, it will be appreciated that a wide variety of applications exist where it would be desirable to maintain the fluid being monitored out of contact with the metallic surface 172 of the reservoir 162.

The sensor apparatus 160 operates in part based on the electromagnetic conductivity (i.e., the dielectric constant) of water-based substances. Due to this electromagnetic conductivity, the spacing between the metallic surface 172, which covers substantially the entire interior surface area of the walls 162*a*–162*e*, and the input plates 164*a*–164*e* can be increased due to the difference in dielectric strength of water and carbon-based fluids. Also, the high electromagnetic conductivity allows the orientation of the input plates 164*a*–164*e* and the orientation of the metallic surfaces 172 to be relaxed (i.e., not maintained in strict parallel relation to one another). However, with these advantages also comes the requirements for shielding the metallic surfaces 172 of each of the walls 162. The new shielding requirements are necessary due to the antenna affects of high dielectric materials.

With further reference to FIG. 9, it would be possible for only a small portion of an interior surface of one of the walls 162a–162e to be covered by a metallized portion or metallic plate. However, the size of such a metallic plate would need to be determined based upon a balancing of capacitive impedances between the metallic plate and the metallic surface 174 on the exterior surface 170 of the walls 162. It is possible for the output or receiver plate 172 to be very small as long as the ground plate 174 is at a great distance away from the reservoir 162. The reason for this is that the signal transmitted from the input plates 164a–164e will be carried throughout the fluid/plastic air to get to a return path. This path will be the path of least resistance. If the path of least resistance is to the ground plate 174, then the signal will be diverted from the output plate 172. The ratio of the output plate impedance versus the ground plate impedance will determine the percentage of signal loss. The basic formula for receiver signal loss is as follows:

$$RCIg = \frac{(d_x \times D_x) + (d_y \times D_y)\ldots}{Ag}$$

$$RCIr = \frac{(d_x \times D_x) + (d_y \times D_y)\ldots}{Ar}$$

$$\% \text{ Loss} = \frac{RCIr}{RCIg} \times 100\%$$

where:

RCIg=Relative Capacitive Impedance of the ground plate

RCIr=Relative Capacitive Impedance of the receiver plate

Ag=surface Area of ground plate

Ar=surface Area of receiver plate $d_{x,y}$=distance through mediums $D_{x,y}$=Dielectric constant of medium Given the following conditions, the loss of signal for a particular container can be calculated. For example:

Given:

5" cubic container receiver plate only being the bottom of the container ground plate external container walls 100%

0.030" walls with Dielectric constant of 3 receiver plate protected by a 0.005" film with a Dielectric constant of 3

$$RCIg = \frac{0.03'' \times 3}{5 \times 25} = 0.00072$$

$$RCIr = \frac{0.005'' \times 3}{25} = 0.00060$$

$$\% \text{ Loss} = \frac{0.00060}{0.00072} \times 100\% = 83.3\% \text{ loss}$$

Due to the ground plate being so close and it's high surface area, most of the signal is lost. Another problem which arises in this scenario is that the loss ratio will change relative to fluid volume. If the reservoir 162 is only half full, the RCIg numerator would be reduced to 4×12.5 since the top of the container would be 2.5" away with a dielectric of 1. This would cause RCIg to become 0.00180 and the loss would be 33.3%. This loss variation could cause problems in the accuracy of high resolution measurements.

If the ground plate is moved away from the reservoir 162 by a 1" air gap, then the percentage loss would be as follows:

$$RCIg = \frac{(0.03'' \times 3) + (1'' \times 1)}{5 \times 49} = 0.00445$$

$$RCIr = \frac{0.005'' \times 3}{25} = 0.00060$$

$$\% \text{ Loss} = \frac{0.00060}{0.00445} \times 100\% = 13.5\% \text{ loss}$$

A half full reservoir 162 would produce a RCIg of 0.01111 and a loss of 5.4%. This loss and deviation of loss are tolerable if high precision is not necessary.

If we allow the output plate 172 to be the whole interior surface, and the ground to be the whole exterior surface of the container, a 0% signal loss can be achieved due to the fact that the transmitted signal can never get to the ground plate 174. This scenario is the most favorable where high accuracy measurements are required.

In order to allow a person external to the container to visually inspect the level as well, a stripe along one side of the container (such as stripe 163) can be void of both the receiver plate 172 and ground plate 174. The only negative affect of this would be possibly the introduction of external EMI noise into the readings. Up to 5% of plate removal would only cause minimal noise induction and up to 25% can be allowed without affecting sensor resolution. Also, if the container is inserted into another container during use, the external container could contain one or both metallic plates. This allows for the inner container (i.e., reservoir) to be a low cost disposable container, as represented by reservoir 180.

The transmitter plates 164a–164e can be inserted into the fluid directly or placed externally against the container. A clearing of the receiver and ground plates is generally required for external input plate assembly 164 placement, as illustrated in FIG. 9. The thickness of the wall 166 (FIG. 10) will determine the amount of energy transferred through the wall 166 and into the fluid. If excessive signal loss from inactive input plate segments 164a–164e is experienced, then the inactive segments can be electrically tied to inputs with a pull down resistor of about 100K ohms, which will prevent excessive signal loss.

Figure 12:
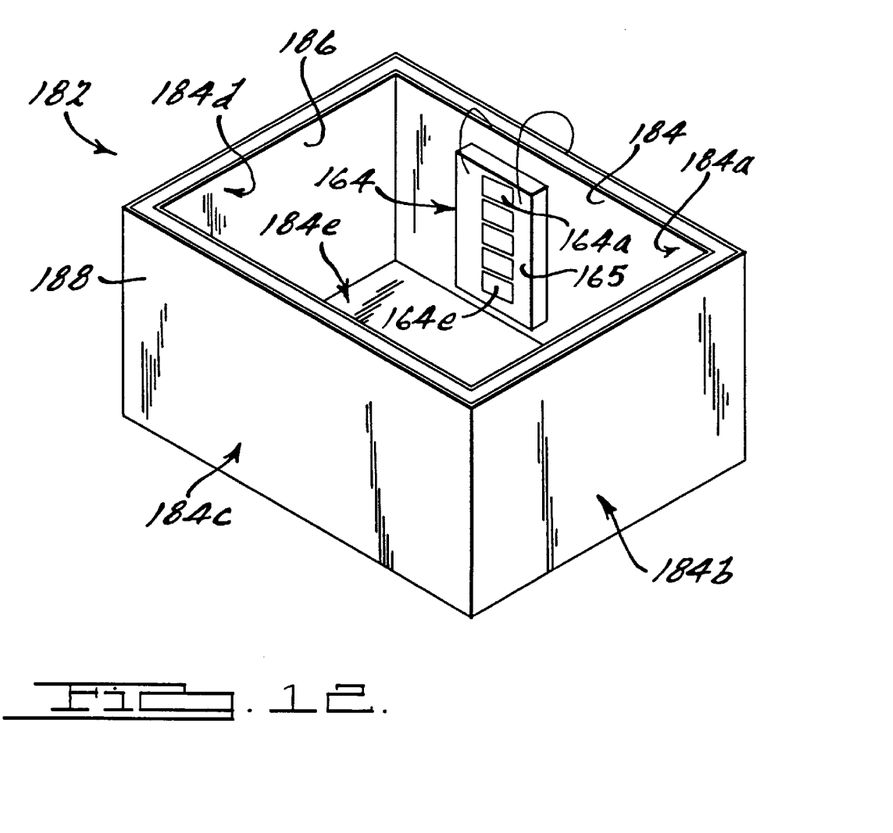
FIG. 12 is an alternative preferred embodiment of the liquid level sensor of the present invention illustrating the input plate assembly disposed on an interior surface of the reservoir.

Referring now to FIG. 12, a sensor apparatus 182 in accordance with another alternative preferred embodiment is shown. The embodiment 182 is substantially identical to the apparatus 160 with the exception that the input plate assembly 164 is positioned on an interior surface 184 of one wall 184a of a reservoir 184. It will be appreciated that the independent input plates 164a–164e are disposed on a printed circuit board 165 and, therefore, are not in contact with a metallic surface 186 which covers the entire interior surface of each wall 184a–184e. A metallic surface 188 covers the entire exterior surface of each wall 184a–184e. Thus, the sensor 180 is even more immune to extraneous electromagnetic interference but the interior of the reservoir is not as readily visually inspected as apparatus 160 shown in FIG. 9.

It will also be appreciated that the preferred embodiments described herein could be easily modified to provide for various forms of lids (either sealed or not) in addition to pressure relief valves, which could be used in connection with the reservoirs described herein in various applications.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for detecting a level of a liquid-based fluid, comprising:

a capacitive element array including a plurality of independent input plates spaced longitudinally along an axis of measurement;

a reservoir for supporting said capacitive element array thereon and a quantity of said fluid therein, said reservoir having an interior wall and an exterior wall and having a metallized surface forming an output plate which substantially conforms to the cross-sectional shape of the reservoir, the output plate being spaced apart from said input plates and having a length sufficient to span all of said input plates;

a controller for sequentially applying an input signal to each one of said input plates sequentially, one at a time, to thereby electrically excite each said input plate;

a current-to-voltage amplifier responsive to said output plate for generating a voltage output signal representative of the current coupled onto said output plate each time one of said input plates is electrically excited by said controller;

a peak detector responsive to said current-to-voltage amplifier for generating a peak voltage signal representative of the peak magnitude of the voltage signal from said current to voltage amplifier each time one of said input plates is electrically excited by said controller;

memory for storing each one of said peak voltage signals associated with the current coupled onto said output plate for each input plate excited by said controller;

said controller including a comparator for comparing said peak voltage signals generated from the excitation of said input plates, one of said input plates at a time in sequential fashion against a reference value, and for determining the difference in each of said peak voltage signals from said reference value, to thereby detect a change in a dielectric of said fluid adjacent any one of said input plates relative to said reference value, to thereby detect a liquid/air interface within said fluid reservoir from which a level of said fluid can be determined; and said controller further operating to determine the percentage of each said input plate that is disposed below said liquid/air interface such that a precise level of said fluid can be determined.

2. The apparatus of claim 1, further comprising an integrator for integrating an output signal generated by said controller representative of said peak voltage signals for providing an analog indication of a level of said fluid within said reservoir.

3. The apparatus of claim 1, further including an interface in communication with said controller for coupling an output representative of said liquid level to an external device.

4. The apparatus of claim 1, wherein said controller includes a low level signal generator for generating an output signal when said fluid level within said reservoir is determined to be below a predetermined lower level limit.

5. The apparatus of claim 1, further comprising an electrically erasable, programmable, read-only memory for storing information for each one of said input plates relating to outputs generated when each said input plate is completely disposed in air and completely submerged in said fluid.

6. The apparatus of claim 1, further comprising a temperature sensor for sensing a temperature of said fluid and providing a signal representative of said sensed temperature to said controller.

7. The apparatus of claim 1, wherein said reservoir includes an electrically insulated, metallic ground plate.

8. The apparatus of claim 1, wherein said metallized surface is formed on said interior wall of said reservoir.

9. The apparatus of claim 1, wherein said reservoir comprises a molded plastic structure, and wherein said metallized surface is embedded in one wall of said reservoir so as not to be exposed to contact with said fluid within said reservoir.

10. The apparatus of claim 1, wherein said metallized surface is formed on said interior wall; and said reservoir further comprising a metallized ground plate secured to said exterior wall adjacent said metallized surface.

11. A liquid level sensing apparatus comprising:

a reservoir having an interior wall and an exterior wall, said interior wall including a metallized portion forming an output plate shaped generally in accordance with a cross-sectional overall shape of said reservoir and said exterior wall including a metallized portion forming a ground plate, said reservoir being adapted to hold a quantity of liquid therein;

an input plate assembly including a plurality of spaced apart metallized input plates, said input plate assembly being disposed so as to be positioned generally vertically within said reservoir, said input plate assembly being approximately equal to or less in length than said output plate; and an electrical circuit assembly for independently electrically exciting each of said input plates, sequentially, one after another and being electrically coupled to said output plate to read a plurality of signals coupled onto said output plate;

said electrical circuit assembly further operating to determine the approximate percentage coverage of each one of said input plates, and from said approximate percentage coverage of said input plates a precise level of said liquid within said reservoir.

12. A method for detecting a level of a liquid within a liquid reservoir, the method comprising:

disposing at least a portion of a probe in said reservoir, wherein said probe includes a plurality of individually excitable input plates and a common output plate, said probe being positioned relative to said reservoir such that at least a portion of one of said output plate or said at least one of said plurality of input plates are disposed in said reservoir;

applying an electrical signal to each one of said input plates, sequentially, one at a time, to electrically excite each said input plate;

reading an output signal generated on said output plate each time one of said input plates is electrically excited;

determining whether each one of said input plates is disposed below a level of said liquid in said reservoir;

extrapolating from which ones of said input plates are disposed below said level of liquid in said reservoir what an actual upper level of said liquid is within said reservoir relative to a known full level;

further comprising the step of determining what percentage of each said input plate is disposed below said upper level of said liquid; and from said percentage of each said input plate which is determined to be below said upper level of said liquid, further extrapolating a precise level of said liquid within said liquid reservoir.

* * * * *